Oct. 18, 1932.    W. F. EAMES    1,882,788
MOTOR CONTROL SYSTEM
Filed April 18, 1930
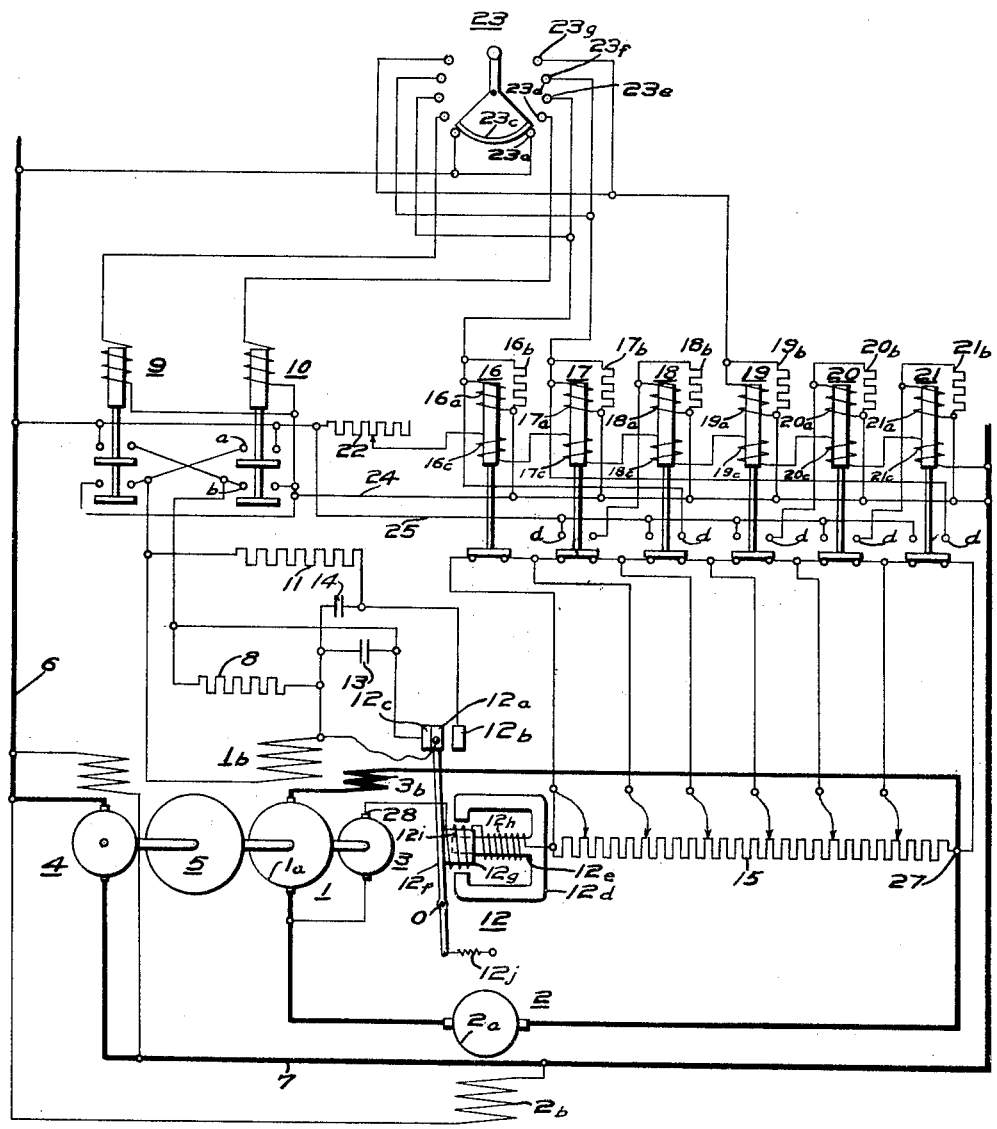
INVENTOR
William F. Eames.
BY
*Charley S. Carr*
ATTORNEY Patented Oct. 18, 1932

1,882,788

UNITED STATES PATENT OFFICE

WILLIAM F. EAMES, OF EDGEWOOD, PENNSYLVANIA, ASSIGNOR TO WESTINGHOUSE ELECTRIC & MANUFACTURING COMPANY, A CORPORATION OF PENNSYLVANIA

MOTOR-CONTROL SYSTEM

Application filed April 18, 1930. Serial No. 445,304.

My invention relates to motor-control systems and has particular relation to motor-control systems of the variable-voltage or Ward-Leonard type. In such systems, the armature of the motor is connected in a loop circuit with the armature of a variable-voltage generator, the speed of the motor being determined by the generator excitation. Reversing switches are provided in any suitable circuit of the system, preferably in the generator field circuit, where reversal of the direction of motor rotation is required.

In such systems, as ordinarily constructed and operated, the motor is accelerated by short-circuiting steps of resistance in the separately-excited field circuit of the generator, and decelerated by re-inserting the steps of resistance; the time constant of the generator-separately-excited field circuit being relied upon to determine the rate of change of generator excitation, and hence, of motor speed, during both acceleration and deceleration. A cumulative series field winding on the generator, or other equivalent compounding means acting on the generator, is commonly provided for correcting the regulation of the system to maintain the motor speed constant, regardless of variations of load.

Such systems are reliable and satisfactory for many purposes but have the disadvantage that the whole period of acceleration or deceleration of the motor cannot be adjusted over as great a range as desirable, and the periods of acceleration or deceleration between intermediate speeds cannot be conveniently adjusted, because of the difficulty in changing the time constant of the generator field. In the case of large generators, the time required to build up the generator field may be of the same order as the time in which it is desired to accelerate the motor, thus introducing difficulties in the adjustment of the motor-acceleration characteristics.

It is, accordingly, an object of my invention to provide a variable-voltage, motor-control system in which the speed of the motor may be determined accurately by the setting of the control apparatus independently of the load on the motor, and in which the period of motor acceleration may be adjusted over a considerable range.

A further object of my invention is to provide a variable-voltage, motor-control system in which the rate of motor acceleration or deceleration, in selected ranges between zero speed and full speed, may be independently adjusted.

According to my invention, I employ field-forcing resistors for accelerating the response of the generator field, and control the field-forcing resistors by a regulator responsive to the motor counter-electromotive force. The motor counter-electromotive force is measured, according to my invention, as the algebraic sum of the motor terminal voltage and a control voltage substantially equal to the resistance drop in the motor armature; the direction of the control voltage relative to the motor terminal voltage depending upon the direction of power flow in the motor circuit.

The control voltage is obtained from an auxiliary generator driven at substantially constant speed and excited in accordance with the motor current. The regulator which I prefer to use responds to a definite value of current through its coils; this value being obtained when the motor counter-electromotive force equals a predetermined value corresponding to a predetermined motor speed.

To accelerate or decelerate the motor, I vary a resistance in series with the regulator coils, thereby varying the ratio between the motor counter-electromotive force and the current at which the regulator responds, hence, varying the motor speed.

To obtain uniform acceleration and deceleration, I control the resistance in series with the regulator coils by means of a series of time-element relays. Arrangements (to be hereinafter more fully described) are provided for varying the time elements of the relays and the proportion of the motor-speed range controlled by each relay.

Other objects of my invention will become evident from the following detailed description, taken in conjunction with the accompanying drawing in which the single figure is a diagrammatic view of a system of control organized in accordance with the present invention.

Referring to the drawing, the apparatus shown therein comprises a direct-current generator 1 having its armature 1a connected in a loop circuit with the armature 2a of a direct-current motor 2. The generator 1 is mounted on a shaft which carries the armature of an auxiliary generator 3, the armature of an exciter 4 for supplying the direct current used in the control system, and any suitable driving means 5. A pair of supply conductors 6 and 7 are connected to the terminals of exciter 4 to be energized therefrom.

The generator 1 is provided with a separately excited field winding 1b arranged to be connected to the supply conductors 6 and 7 in series with a field-forcing resistor 8 by either of a pair of reversing switches 9 and 10. The auxiliary generator 3 is provided with a series field winding 3b connected in the loop circuit of the generator 1 and motor 2. The motor 2 is provided with a separately excited field winding 2b, connected to the supply conductors 6 and 7.

A resistor 11 is arranged to be connected in parallel with the generator-separately-excited field winding 1b by means of contact members 12a and 12b of a regulator 12.

The regulator 12 is of the moving-coil type disclosed in a copending application of Walter Schaelchlin, Serial No. 221,422, filed September 23, 1927 and assigned to the Westinghouse Electric & Manufacturing Company. This regulator comprises a magnetic structure 12d having a core 12e and a movable armature 12f. The movable armature 12f is pivoted at O and carries a movable contact member 12a at its free end. A cylinder 12g of insulating material is mounted on the movable armature 12f between the core 12e and the outer shell of the magnetic structure 12d. A winding 12h is mounted on the core 12e, and a second winding 12i is mounted on the cylinder 12g, the windings 12h and 12i being in inductive relation to each other through the magnetic structure 12d.

The movable contact member 12a is arranged to engage a stationary contact member 12b in one position or a second stationary contact member 12c in another position, the space between the contact members 12b and 12c being sufficient to permit the movable contact member 12a to assume a neutral position in which neither stationary contact member is engaged.

The armature 12f is biased by a spring 12j to the position in which the movable contact member 12a engages the stationary contact member 12c. A condenser 13 is connected between the contact members 12a and 12c for reducing sparking at the contact members, and a similar condenser 14, for a similar purpose, is connected between the contact members 12a and 12b.

The contact members 12a, 12b and 12c are so connected in the external circuit that, when movable contact member 12a engages stationary contact member 12c, the field-forcing resistor 8, in series with the generator separately excited field winding 1b, is short circuited, and, when the movable contact member 12a engages the stationary contact member 12b, the field-forcing resistor 11 is connected in shunt to the field winding 1b.

The resistance values of resistors 8 and 11 is so related to the inductance of the field winding 1b and the voltage between the supply conductors 6 and 7 that the excitation of the generator may be varied rapidly by the regulator 12 at any point in the working range.

The moving coil 12i and the stationary coil 12h of the regulator 12 are connected across the terminals of the motor 2 in series with the armature of auxiliary generator 3 and a resistor 15. A plurality of relays 16, 17, 18, 19, 20 and 21 are arranged to short circuit sections of the resistor 15 when de-energized. Each of the relays 16 to 21 inclusive is provided with an operation coil 16a, 17a etc., the inductance and resistance of which are so related that the relay is delayed for an appreciable time after energization before it operates. A resistor 16b, 17b etc., is connected in parallel with the operating coil of each relay for introducing a time delay in the dropping out of the relay.

The relays 16, 17, 18, 19, 20 and 21 may also be provided with de-magnetizing coils 16c, 17c etc., wound in a direction opposite to that of the operating coils and of sufficient number of turns to overcome the residual magnetism of the relays. The de-magnetizing coils 16c, 17c, etc., are connected to the supply conductors 6 and 7 in series with a rheostat 22. By adjusting the rheostat 22, the time elements of the relays may be varied.

The relays 16, 17, 18, 19, 20 and 21 are arranged in groups; the first relay of each group being controlled from a contact member of a manual controller 23, and each of the remaining relays of the group being operated at predetermined time intervals from the relay next preceding it in closing sequence. The last relay of each group, except the first controls a holding circuit for the first relay (16, 17) of the group next preceding it in closing sequence, so that, if the manual controller 23 is suddenly moved from high-speed position to low-speed position, the relays will drop out, one at a time, at predetermined time intervals. In the arrangement shown, the closing sequence is 16, 17, 18, 19, 20 and 21 and the opening sequence is 19, 20, 21, 17, 18 and 16.

While, for simplicity, I have shown only six accelerating relays divided into three groups of one, two and three relays each, it will be understood that, in practice, a large number of relays divided into a number of groups, corresponding to the number and values of motor speeds desired, may be utilized. For example, with relays which operate with a time delay of approximately .2 second in a system in which it is desired to accelerate the motor in approximately 2.8 seconds, fourteen relays would be used, divided into groups according to the number and values of motor speeds desired.

The operation of the above described apparatus may be set forth as follows. Assuming that the driving means 5 is in operation, and the manual controller 23 is centered; the exciter 4 is generating a voltage; the supply conductors 6 and 7 are energized; the field of motor 2 is energized, the reversing switches 9 and 10 and accelerating relays 16, 17, 18, 19, 20 and 21 are all deenergized.

If the handle of manual controller 23 is moved to the left, contact segment 23c of the manual controller 23 bridges contact members 23a and 23d, completing a circuit for the operating coil of reversing switch 10. This circuit may be traced from supply conductor 6, through contact members 23a, 23c and 23d of the manual controller 23, the operating coil of reversing switch 10, thence, through conductor 24, to supply conductor 7.

Reversing switch 10 closes, completing a circuit for the generator-separately-excited field winding 1b, as follows; from supply conductor 6, through contact members a of reversing switch 10, the generator field winding 1b, contact members 12c and 12a of regulator 12, contact members b of reversing switch 10 and conductor 24, to supply conductor 7. The voltage of generator 1 now builds up, causing a current to flow in the loop circuit and the motor 2 to turn. The motor current, flowing through the field winding 3b, causes the auxiliary generator 3 to generate a control voltage. The auxiliary generator 3 is so designed and adjusted that the control voltage generated by it for any value of motor current is substantially equal to the resistance drop in the armature 2a of motor 2 and is in such direction that it opposes the motor terminal voltage when the motor 2 is drawing power from the generator 1 and adds to the motor terminal voltage when the motor is regenerating. The voltage between the point 28 in the regulator circuit and the junction point 27 is, therefore, at all times substantially equal to the counter-electromotive force of the motor 2.

As the motor 2 speeds up, its counter-electromotive force increases to such value that the current in the winding 12i of the regulator, acting upon the flux in the magnetic structure 12d due to the current in the winding 12h, produces sufficient force on regulator armature 12f to move the armature clockwise against the tension of spring 12j. When this occurs, contact member 12a of the regulator is disengaged from contact member 12c to insert the resistor 8 in series with the generator field winding 1b. The generator voltage now decreases until the motor counter-electromotive force falls to such value that contact members 12a and 12c of the regulator re-engage. The regulator 12 thus vibrates, maintaining the voltage of generator 1 at such value that the counter-electromotive force, and hence, the speed of motor 2, is maintained at a predetermined value. If the load on motor 2 changes, the armature current changes, changing the control voltage generated by auxiliary generator 3 and causing the voltage of generator 1 to change to such value that the counter-electromotive of motor 2 is returned to the predetermined value.

If the load on motor 2 is overhauling, the movable contact member 12a of the regulator 12 vibrates into and out of engagement with the contact member 12b, reducing the voltage of generator 1 to such value that the counter-electromotive force of motor 2 remains at the predetermined value. The speed of motor 2 is thus maintained constant, regardless of the value or direction of the load.

If the handle of manual controller 23 is moved farther to the left to the next operating point, contact segment 23c bridges contact members 23a and 23e, to complete a circuit for the operating coil 16a of relay 16. This circuit may be traced from supply conductor 6, through contact members 23a, 23c and 23e of the manual controller, the operating coil of relay 16 and conductor 24, to supply conductor 7. Because of the time element of its operating coil 16a, relay 16 does not immediately respond. After the expiration of a predetermined time interval, relay 16 operates to remove a short circuit from a portion of resistor 15. Because of the increase of resistance in the regulator circuit, the value of motor counter-electromotive force required to produce a current in the coils 12h and 12i of the regulator 12 of sufficient value to overcome the tension of spring 12j, is increased to a second value. The contact members 12a and 12c of the regulator, therefore, remain in engagement until the motor counter-electromotive force increases to the second value, after which the regulator operates, in the manner previously described, to maintain the motor speed constant at a higher value.

If the handle of manual controller 23 is moved further to the left, to the next operating point, contact segment 23c of the manual controller bridges contact members 23a and 23f to complete a circuit for the operating coil 17a of relay 17. This circuit may be traced from supply conductor 6, through contact members 23a, 23c and 23f of the manual controller, the operating coil 17a of relay 17 and conductor 24, to supply conductor 7. Because of the time element of its operating coil 17a, relay 17 does not immediately respond. After the expiration of a predetermined time interval, relay 17 operates to remove a short circuit from a second portion of resistor 15 and to complete a circuit for the operating coil or relay 18.

The circuit for relay 18 extends from supply conductor 6, through conductor 25, contact members d of relay 17, the operating coil 18a of relay 18 and conductor 24, to supply conductor 7. Because of the time element of its operating coil 18a, relay 18 does not immediately respond. After the expiration of a predetermined time interval, relay 18 operates to remove a short circuit from a third portion of resistor 15 and to complete a holding circuit for the relay 16. This circuit may be traced from supply conductor 6, through conductor 25, contact members d of relay 18, the operating coil 16a and conductor 24 to supply conductor 7. The successive operation of relays 17 and 18, at predetermined time intervals, increases the value of motor counter-electromotive force required to operate the regulator 12, hence increasing the motor speed in steps, the regulator 12 operating to maintain the motor speed in steps and to maintain the motor speed constant at each value, regardless of load.

If the handle of manual controller 23 is moved further to the left, to the last operating point, contact segment 23c of the manual controller bridges contact members 23a and 23g to complete a circuit for the operating coil 19a of relay 19. This circuit may be traced from supply conductor 6, through contact members 23a, 23c and 23g of the manual controller, the operating coil 19a of relay 19 and conductor 24, to supply conductor 7. Because of the time element of its operating coil 19a, relay 19 does not immediately respond. After the expiration of a predetermined time interval, relay 19 operates to remove a short circuit from a fourth section of resistor 15 and to complete a circuit for the operating coil 20a of relay 20.

This circuit extends from supply conductor 6, through conductor 25, contact members d of relay 19, the operating coil 20a of relay 20 and conductor 24, to supply conductor 7. Because of the time element of its operating coil 20a, relay 20 does not immediately respond. After the expiration of a predetermined time interval, relay 20 operates to remove a short circuit from a fifth portion of resistor 15 and to complete a circuit for the operating coil of relay 21. This circuit extends from supply conductor 6, through conductor 25, contact members d of relay 20, the operating coil 21a of relay 21 and conductor 24, to supply conductor 7. Because of the time element of its operating coil 21a, relay 21 does not immediately respond. After the expiration of a predetermined time interval, relay 21 operates to remove a short circuit from a sixth portion of resistor 15 and to complete a holding circuit for relay 17.

This circuit extends from supply conductor 6, through conductor 25, contact members d of relay 21, the operating coil 17a of relay 17, and conductor 24, to supply conductor 7. The successive operation of relays 19, 20 and 21, at predetermined time intervals, increases the value of motor counter-electromotive force required to operate the regulator 12, hence increasing the motor speed in steps, the regulator 12 operating to maintain the motor speed constant at each value, regardless of load. The motor 2 now operates at full speed.

If the handle of manual controller 23 is now returned toward central position, the circuit of relay 19 is broken at contact member 23g. The operating coil 19a of relay 19 now commences to discharge through resistor 19b, the relay being temporarily held in by the discharge current. After the expiration of a predetermined time interval, relay 19 drops out to short circuit a section of resistor 15 and to break the circuit of the operating coil 20a of relay 20. The operating coil 20a now commences to discharge through resistor 20b. After the expiration of a predetermined time interval, relay 20 drops out to short circuit a section of resistor 15 and to break the circuit of the operating coil 21a of relay 21. After the expiration of a predetermined time interval, relay 21 drops out to short circuit a section of resistor 15 and to break the holding circuit of relay 17.

If the handle of manual controller 23 is returned further toward central position, the closing circuit of relay 17 is broken, and relays 17 and 18 drop out successively, in the same manner as relays 19, 20 and 21.

If the handle of manual controller is returned farther toward central position, relay 16 drops out. The successive dropping out of relays 19, 20, 21, 17, 18 and 16, at predetermined time intervals, reduces the motor speed gradually from high speed to low speed, the regulator 12 acting to maintain the motor speed constant at each value, regardless of load.

If the manual controller is now centered, the circuit of reversing switch 10 is broken, and the system is restored to its initial condition. Further operation of the motor 2 in either direction may be initiated by the manual controller 23.

While I have described a complete cycle of operation from rest to full speed and back to rest, it will be understood that the motor may be operated continuously at any intermediate speed, for which an operating point is provided on the manual controller 23, by arresting the controller at the corresponding operating point.

By adjusting the total value of resistor 15, the full speed of motor 2 may be adjusted to suit operating conditions. By adjusting the proportion of resistor 15 controlled by each of the relays 16 to 21, the percentage change of the motor speed caused by the operation of each relay may be simultaneously adjusted by changing the setting of rheostat 22.

In my copending application Serial No. 428,647, filed February 15, 1930, I have disclosed a motor-control system of the variable voltage type, in which the excitation of the generator supplying the work motor is controlled by a regulator responsive to the differences of voltages of an auxiliary generator driven at variable speed and a second auxiliary generator driven by the work motor, in such manner as to eliminate the effect of load upon the speed of the work motor.

In my copending application Serial No. 428,650, filed February 15, 1930, I have disclosed a variable voltage motor-control system, in which the excitation of the generator supplying the work motor is controlled in accordance with the difference of voltages of a potentiometer controlled by a series of time element relays and an auxiliary generator driven by the work motor, in such manner as to eliminate the effect of load upon the speed of the work motor.

In my copending application Serial No. 428,648, filed February 15, 1930, I have disclosed a variable voltage motor-control system, in which the excitation of the generator supplying the work motor is controlled by means of a differential device responsive to differential rotation of the work motor and an auxiliary motor, in such a manner as to eliminate the effect of load on the speed of the work motor, and in which the speed and rate of change of speed of the auxiliary motor may be independently controlled.

In my copending application Serial No. 445,303, filed April 18, 1930, I have disclosed a variable voltage motor-control system, in which the excitation of the generator supplying the work motor is controlled in accordance with the difference between the counter-electromotive force of the work motor and the voltage of an auxiliary generator driven at constant speed, in such a manner as to eliminate the effect of load upon the speed of the work motor.

In my copending application Serial No. 471,684, filed July 30, 1930, (W. E. Case 15,301), I have disclosed an elevator system, in which the speed regulation of the elevator motor is corrected by means of a compounding arrangement and the rate of deceleration of the elevator motor is controlled by time element means, and in which a load responsive device is provided for operating upon the time element means to obtain uniform deceleration under all load conditions.

In my copending application Serial No. 547,389, filed June 27, 1931 (W. E. Case 16,025), I have disclosed a variable voltage motor-control system, in which the excitation of the generator supplying the work motor is controlled in accordance with the difference between the counter-electromotive force of the work motor and the voltage of an auxiliary generator driven at variable speed, in such a manner as to eliminate the effect of load upon the speed of the work motor.

In the present application, I do not claim the control of the generator excitation broadly in accordance with a voltage proportional to the difference between the actual speed of the motor and a predetermined control speed, as this is the subject matter of my application Serial No. 428,647, filed February 15, 1930, mentioned above.

I do not claim the control of the generator excitation to cause the speed of the work motor to follow a predetermined succession of values, each independent of load, nor the control of the generator excitation in accordance with a control voltage furnished by the specific means of a potentiometer, nor the control of a field forcing resistor broadly in accordance with the speed of the work motor, as this subject matter is covered in my copending application Serial No. 428,650, filed February 15, 1930, mentioned above.

In the present application, I do not claim the control of the generator excitation in accordance with the differential rotation of the work motor, as compared with an independently driven rotary element, as this subject matter is claimed in my copending application Serial No. 428,648, filed February 15, 1930, mentioned above.

In the present application, I do not claim the control of the generator excitation by means responsive to a control voltage, the terminal voltage of the motor, and a voltage proportional to the motor armature current, nor by means responsive to a control voltage substantially equal to the counter-electromotive force of the work motor, as this subject matter is covered in my copending application Serial No. 445,303, filed April 18, 1930, mentioned above.

In the present application, I do not claim the control of the rate of change of speed of an elevator motor by means including a load responsive element for correcting the motor speed regulation, means for determining the rate of change of speed of the elevator motor, and additional load responsive means for operating upon the last mentioned means to cause the rate of change of speed of the elevator motor to be the same under all load conditions, as this subject matter is claimed in my copending application Serial No. 471,684, filed July 30, 1930, mentioned above.

I do not claim the control of the generator excitation by means responsive to the counter-electromotive force of the motor and a voltage furnished by the specific means of a control generator driven at variable speed, nor to the control of the generator excitation by means involving an auxiliary machine decelerated by the specific means of an electromagnetic brake, as this subject matter is claimed in my copending application Serial No. 547,389, mentioned above.

I do not wish to be restricted to the specific structural details, arrangement of parts or circuit connections herein set forth, as various modifications thereof may be effected without departing from the spirit and scope of my invention. I desire, therefore, not only such limitations shall be imposed as are indicated in the appended claims.

I claim as my invention:

1. In a motor-control system, a motor, a generator, electrical connections between the armatures of said motor and said generator, means for generating a control voltage which varies in accordance with the current in said connections, and means responsive to said control voltage and the voltage between said connections for maintaining the speed of said motor constant, regardless of variations of load.

2. In a motor-control system, a motor, a generator, electrical connections between the armatures of said motor and said generator, means responsive to the current in said connections for generating a control voltage substantially equal to the armature-resistance-drop voltage of said motor, and means responsive to said control voltage and the voltage between said connection for maintaining the speed of said motor constant, regardless of variations of load.

3. In a motor-control system, a motor, a generator, electrical connections between the armatures of said motor and said generator, means for generating a control voltage which varies in accordance with the current in said connections, and means responsive to said control voltage and the voltage between said connections for increasing the excitation of said generator when said generator supplies power to said motor and for decreasing the excitation of said generator when said motor supplies power to said generator.

4. In a motor-control system, a motor, a generator, electrical connections between the armatures of said motor and said generator, means for generating a control voltage which varies in accordance with the current in said connections, and means responsive to said control voltage and the voltage between said connections for controlling the excitation of said generator to maintain the counter-electromotive force of said motor constant, regardless of variations of load.

5. In a motor-control system, a motor, a main generator, electrical connections between the armatures of said motor and said main generator, an auxiliary generator having a field winding energized in accordance with the current in said connections, and a regulator responsive to the voltage of said auxiliary generator and the voltage between said connections for increasing the excitation of said main generator when said main generator supplies power to said motor and for decreasing the excitation of said main generator when said motor supplies power to said main generator.

6. In a motor-control system, a motor, a main generator, electrical connections between the armatures of said motor and said main generator, an auxiliary generator having a field winding energized in accordance with the current in said connections, and a regulator responsive to the voltage of said auxiliary generator and the voltage of said motor for controlling the excitation of said generator to maintain the counter-electromotive force of said motor constant, regardless of variations of load.

7. In a motor-control system, a motor, a generator, electrical connections between the armatures of said motor and said generator, a resistor in series with the field winding of said generator, a magnetic structure, means for producing a flux in said magnetic structure which varies in accordance with the counter-electromotive force of said motor, and means responsive to the flux in said magnetic structure for modifying the effect of said resistor when the speed of said motor equals a predetermined value.

8. In a motor-control system, a motor, a generator, electrical connections between the armatures of said motor and said generator, a field-forcing resistor in series with the field winding of said generator, a circuit in parallel with said resistor, contact members in said circuit, a magnetic structure, means for producing a flux in said magnetic structure which varies in accordance with the counter-electromotive force of said motor, and means for maintaining said contact members closed when the speed of said motor is below a predetermined value and for opening said contact members when the speed of said motor exceeds said predetermined value, said last mentioned means comprising means responsive to the flux in said magnetic structure.

9. In a motor-control system, a motor, a generator, electrical connections between the armatures of said motor and said generator, a resistor in series with the field winding of said generator, a circuit in parallel with the field winding of said generator, contact members in said circuit, a magnetic structure, means for producing a flux in said magnetic structure which varies in accordance with the counter-electromotive force of said motor, and means for maintaining said contact members open when the speed of said motor is below a predetermined value and for closing said contact members when the speed of said motor exceeds said predetermined value, said last mentioned means comprising means responsive to the flux in said magnetic structure.

10. In a motor-control system, a motor, a generator, electrical connections between the armatures of said motor and said generator, a magnetic structure, means for producing a flux in said magnetic structure which varies in accordance with the counter-electromotive force of said motor, means responsive to said flux for controlling the excitation of said generator to maintain the speed of said motor at a predetermined value, regardless of variations of load, and means for changing the proportionality of said counter-electromotive force and said flux for causing said second mentioned means to maintain the speed of said motor at a different predetermined value, regardless of variations of load.

11. In a motor-control system, a motor, a generator, electrical connections between the armatures of said motor and said generator, a magnetic structure, means for producing a flux in said magnetic structure having a predetermined ratio to the counter-electromotive force of said motor, means responsive to said flux for controlling the excitation of said generator to maintain the speed of said motor at a predetermined value, regardless of variations of load, and means for causing said ratio to have successively different values at the expiration of predetermined intervals of time, whereby the speed of said motor attains a succession of different values, each independent of the load on said motor.

12. In a motor-control system, a motor, a generator, electrical connections between the armatures of said motor and said generator, means for generating a control voltage which varies in accordance with the current in said connections, means responsive to said control voltage and the terminal voltage of said motor for producing a control current proportional to the counter-electromotive force of said motor, means responsive to said control current for controlling the excitation of said generator to maintain the speed of said motor at a predetermined value, regardless of variations of load, and means for changing the proportionality of said control current and said counter-electromotive force for causing said second mentioned means to maintain the speed of said motor at a different predetermined value, regardless of variations of load.

13. In a motor-control system, a motor, a main generator, electrical connections between the armatures of said motor and said main generator, an auxiliary generator having a field winding energized in accordance with the current in said connections, a magnetic structure, electrical connections completing a circuit including the armature of said motor, the armature of said auxiliary generator and said winding, whereby a predetermined ratio is established between the current in said winding and the sum of the voltages of the armatures of said motor and said auxiliary generator, means responsive to the flux in said magnetic structure for increasing the excitation of said main generator when said main generator supplies power to said motor and for decreasing the excitation of said main generator when said motor supplies power to said main generator, and means for changing said predetermined ratio.

14. In a motor-control system, a motor, a main generator, electrical connection between the armatures of said motor and said main generator, an auxiliary generator having a field winding energized in accordance with the current in said connections, a magnetic structure, a winding interlinked with said magnetic structure, electrical connections completing a circuit to include the armature of said motor, the armature of said auxiliary generator and said winding, whereby a predetermined ratio is established between the current in said winding and the sum of the voltages of the armatures of said motor and said auxiliary generator, means responsive to the flux in said magnetic structure for controlling the excitation of said main generator to maintain the speed of said motor at a predetermined value, regardless of variations of load, and means for changing said predetermined ratio to cause the speed of said motor to be maintained at a different predetermined value.

15. In a motor-control system, a motor, a main generator, electrical connections between the armatures of said motor and said main generator, an auxiliary generator having a field winding energized in accordance with the current in said connections, a regulator having contact members and a winding for operating said contact members, a variable resistor, conductors interconnecting the armature of said motor, the armature of said auxiliary generator, the winding of said regulator and said resistor in such manner that a predetermined ratio between the current in the winding of said regulator and the sum of the voltages of said motor and said auxiliary generator is established for each setting of said resistor, and electrical connections between said contact members and the field winding of said main generator, whereby said contact members vary the excitation of said main generator in such direction as to reduce the difference between the actual current in the winding of said regulator and a predetermined current value.

16. In a motor-control system, a motor, a generator, electrical connections between the armatures of said motor and said generator, means for generating a control voltage which varies in accordance with the current in said connections, means responsive to said control voltage and the terminal voltage of said motor for producing a control current having a predetermined ratio to the counter-electromotive force of said motor, means responsive to said control current for controlling the excitation of said generator to maintain the speed of said motor at a predetermined value, regardless of variations of load, and means for causing said ratio to have successively different values at the expiration of predetermined intervals of time, whereby the speed of said motor attains a succession of different values, each independent of the load on said motor.

17. In a motor-control system, a motor, a main generator, electrical connections between the armatures of said motor and said main generator, means for adjusting the excitation of said main generator in accordance with a predetermined value of motor speed, a correction generator having a field winding energized in accordance with the current in said connections, a winding electrically connected with the armature of said correction generator, and means responsive to the current in said last mentioned winding for increasing the excitation of said main generator when said main generator supplies power to said motor and for decreasing the excitation of said main generator when said motor supplies power to said main generator.

18. In a motor-control system, a motor, a main generator, electrical connections between the armatures of said motor and said main generator, means for adjusting the excitation of said main generator in accordance with a predetermined value of motor speed, a correction generator having a field winding energized in accordance with the current in said connections and a regulating device comprising a winding electrically connected with the armature of said correction generator and means responsive to the current in said last mentioned winding for controlling the excitation of said main generator to maintain the speed of said motor at said predetermined value, regardless of variations of load.

In testimony whereof, I have hereunto subscribed my name this 11th day of April, 1930.

WILLIAM F. EAMES.